United States Patent
Meredith et al.

(10) Patent No.: US 7,090,943 B2
(45) Date of Patent: Aug. 15, 2006

(54) REGULATING THE COMMUNICATION OF POWER TO COMPONENTS OF A FUEL CELL SYSTEM

(75) Inventors: John Meredith, Stuyvesant, NY (US); Mark Pellerin, Malta, NY (US); Dustan L. Skidmore, Troy, NY (US)

(73) Assignee: Plug Power Inc., Latham, NY (US)

( * ) Notice: Subject to any disclaimer, the term of this patent is extended or adjusted under 35 U.S.C. 154(b) by 572 days.

(21) Appl. No.: 10/350,639

(22) Filed: Jan. 23, 2003

(65) Prior Publication Data

US 2004/0146755 A1 Jul. 29, 2004

(51) Int. Cl.
*H01M 8/02* (2006.01)

(52) U.S. Cl. .............. 429/34; 429/13; 307/118

(58) Field of Classification Search ............ 307/36, 307/153, 118; 903/944; 429/34, 13, 25, 429/52
See application file for complete search history.

(56) References Cited

U.S. PATENT DOCUMENTS

| | | | | |
|---|---|---|---|---|
| 3,872,473 A | * | 3/1975 | Melgaard et al. ........... | 340/644 |
| 3,999,175 A | * | 12/1976 | Thibodeau ................. | 340/644 |
| 4,517,259 A | | 5/1985 | Lance ........................ | 429/26 |
| 4,766,044 A | | 8/1988 | Sederquist .................. | 429/19 |
| 5,178,969 A | | 1/1993 | Amemiya .................... | 429/26 |
| 5,235,846 A | | 8/1993 | Fanciullo .................... | 73/40.7 |
| 5,248,567 A | | 9/1993 | Amemiya et al. ............ | 429/20 |
| 5,314,762 A | | 5/1994 | Hamada et al. .............. | 429/37 |
| 5,340,663 A | | 8/1994 | Buswell et al. .............. | 429/17 |
| 5,356,729 A | | 10/1994 | Pedicini ..................... | 429/27 |
| 5,763,113 A | * | 6/1998 | Meltser et al. .............. | 429/22 |
| 5,851,689 A | | 12/1998 | Chen .......................... | 429/13 |
| 5,856,034 A | | 1/1999 | Huppmann et al. .......... | 429/17 |
| 5,976,725 A | | 11/1999 | Gamo et al. ................. | 429/25 |
| 5,980,726 A | | 11/1999 | Moulthrop, Jr. et al. .... | 205/637 |
| 6,007,930 A | * | 12/1999 | Adams et al. ............... | 429/13 |
| 6,280,869 B1 | | 8/2001 | Chen .......................... | 429/13 |
| 6,610,431 B1 | | 8/2003 | Walsh et al. ................. | 429/13 |
| 6,787,263 B1 | | 9/2004 | Walsh et al. ................. | 429/34 |
| 6,887,606 B1 | * | 5/2005 | Parr et al. ................... | 429/22 |

* cited by examiner

*Primary Examiner*—Brian Sircus
*Assistant Examiner*—Andrew M. Deschere
(74) *Attorney, Agent, or Firm*—Trop, Pruner & Hu, P.C.

(57) ABSTRACT

A technique includes providing power to a group fuel cell system components and providing sensors to monitor conditions of the fuel cell system. The status of each sensor is associated with a switch, and the switches are serially coupled together. The delivery of power to the fuel cell system components is regulated in response to states of the switches.

17 Claims, 5 Drawing Sheets

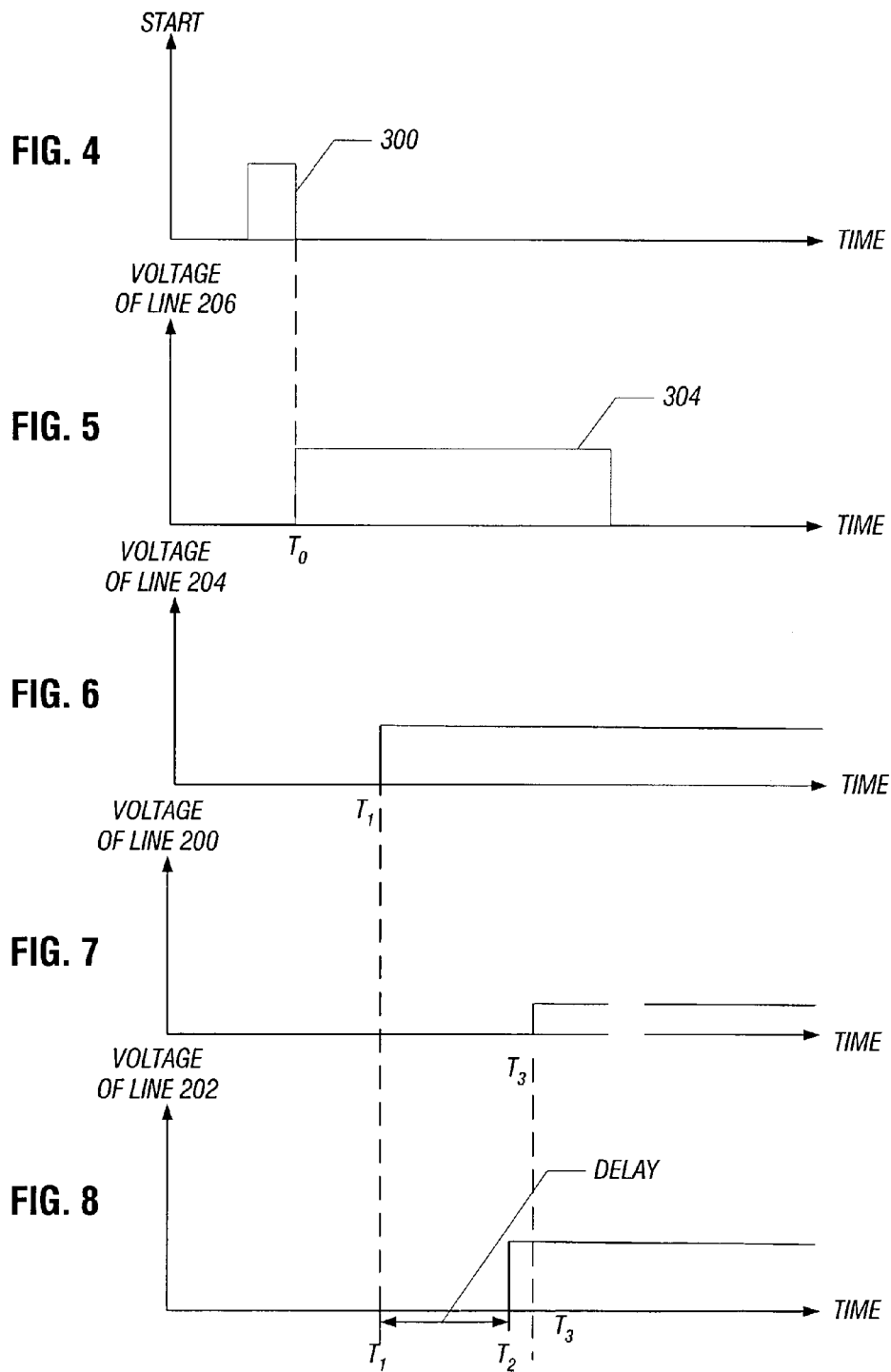

REGULATING THE COMMUNICATION OF POWER TO COMPONENTS OF A FUEL CELL SYSTEM

BACKGROUND

The invention generally relates to a regulating the communication of power to components of a fuel cell system.

A fuel cell is an electrochemical device that converts chemical energy produced by a reaction directly into electrical energy. For example, one type of fuel cell includes a polymer electrolyte membrane (PEM), often called a proton exchange membrane, that permits only protons to pass between an anode and a cathode of the fuel cell. At the anode, diatomic hydrogen (a fuel) is reacted to produce hydrogen protons that pass through the PEM. The electrons produced by this reaction travel through circuitry that is external to the fuel cell to form an electrical current. At the cathode, oxygen is reduced and reacts with the hydrogen protons to form water. The anodic and cathodic reactions are described by the following equations:

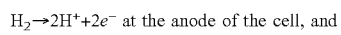
$H_2 \rightarrow 2H^+ + 2e^-$ at the anode of the cell, and

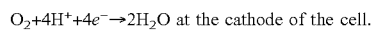
$O_2 + 4H^+ + 4e^- \rightarrow 2H_2O$ at the cathode of the cell.

A typical fuel cell has a terminal voltage near one volt DC. For purposes of producing much larger voltages, several fuel cells may be assembled together to form an arrangement called a fuel cell stack, an arrangement in which the fuel cells are electrically coupled together in series to form a larger DC voltage (a voltage near 100 volts DC, for example) and to provide more power.

The fuel cell stack may include flow plates (graphite composite or metal plates, as examples) that are stacked one on top of the other, and each plate may be associated with more than one fuel cell of the stack. The plates may include various surface flow channels and orifices to, as examples, route the reactants and products through the fuel cell stack. Several PEMs (each one being associated with a particular fuel cell) may be dispersed throughout the stack between the anodes and cathodes of the different fuel cells. Electrically conductive gas diffusion layers (GDLs) may be located on each side of each PEM to form the anode and cathodes of each fuel cell. In this manner, reactant gases from each side of the PEM may leave the flow channels and diffuse through the GDLs to reach the PEM.

The powering up of the fuel cell system must be carefully regulated, especially in view of the various stray gases that may be present. In this manner, the fuel cell system must be powered up in a manner to ensure that if significant levels of certain stray gases (hydrogen, for example) are present, these levels are reduced before electricity is provided to components of the fuel cell system. Otherwise, a hazardous condition may result, as an electrical spark may ignite a stray gas.

The presence of significant stray gas levels inside the compartment is an example of one of the various alarm conditions that need to be monitored in connection with operation of the fuel cell system. Thus, the fuel cell system typically include various sensors for purposes of detecting these alarm conditions. In this manner, should a sensor in the fuel cell compartment indicate an unacceptable level of a particular stray gas or another alarm condition (such as an over temperature condition or an over pressure condition (as examples)) during power up or at any other time, corrective action may need to be taken.

Thus, there is a continuing need for better techniques and arrangements to control the delivery of power to components of the fuel cell system.

SUMMARY

In an embodiment of the invention, a technique includes providing power to a group of components of the fuel cell system and providing sensors to monitor conditions of the fuel cell system. The status of each sensor is associated with a switch, and the switches are serially coupled together. The delivery of power to the fuel cell system components is regulated in response to states of the switches.

Advantages and other features of the invention will become apparent from the following description, drawing and claims.

BRIEF DESCRIPTION OF THE DRAWING

FIGS. 4, 5, 6, 7 and 8 are waveforms of various signals present in the fuel cell system according to an embodiment of the invention.

DETAILED DESCRIPTION

Figure 1:
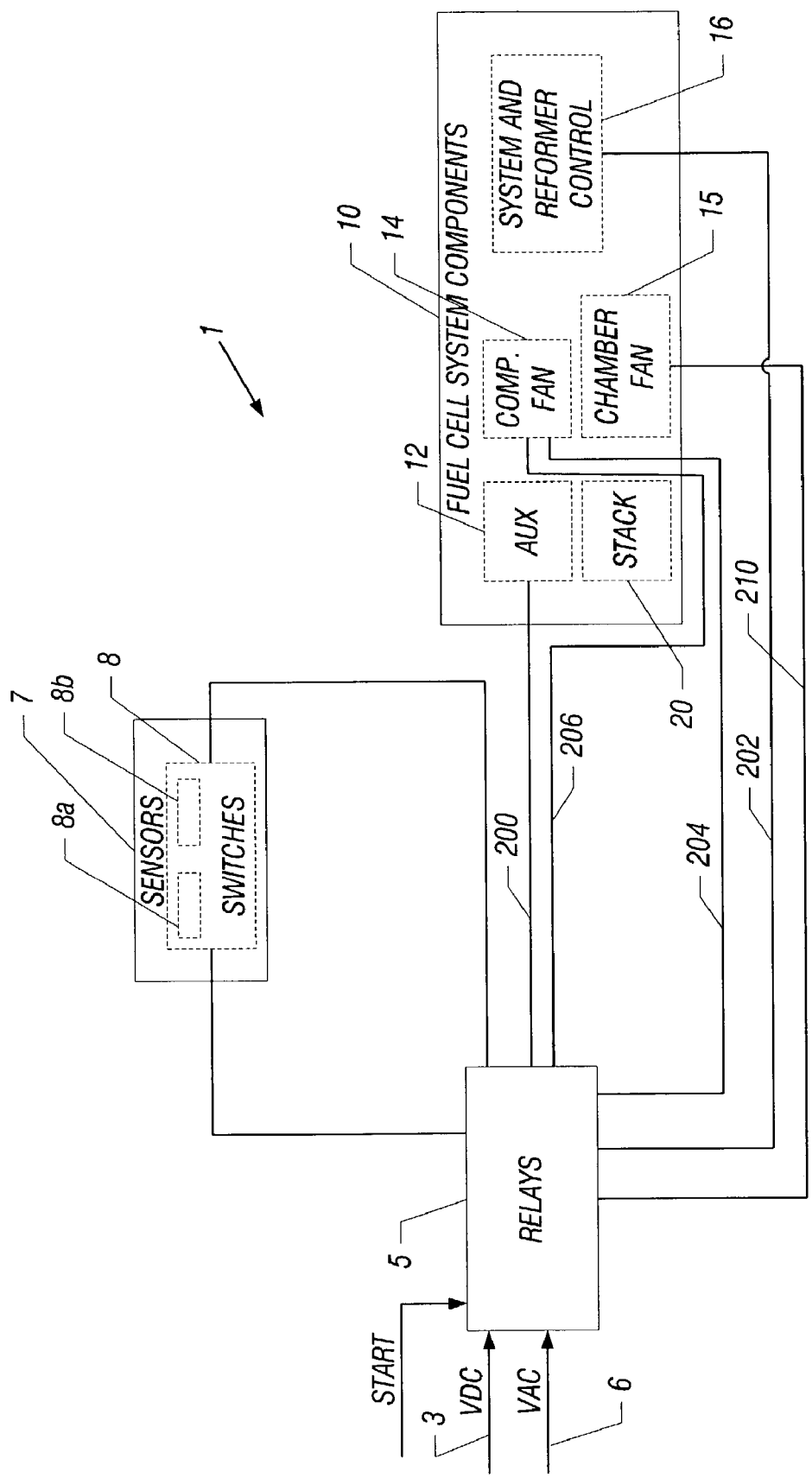
FIG. 1 is a schematic diagram of a fuel cell system according to an embodiment of the invention.

Referring to FIG. 1, an embodiment 1 of a fuel cell system in accordance with the invention includes circuitry to control the delivery of power to the various components 10 of the fuel cell system 1. Without this power, the components 10 do not operate, and thus, by controlling the communication of power to these components 10, the fuel cell system 1 may be prevented from powering up and may be promptly shut down if an alarm condition is present. For example, in some embodiments of the invention, this circuitry includes relays 5 that control the communication of a positive DC supply voltage signal (called $V_{DC}$) and an AC voltage signal ($V_{AC}$) to the components 10. As an example, in some embodiments of the invention, the $V_{DC}$ and $V_{AC}$ signals may be initially provided by a battery (of the fuel cell system 10) and power grid (to which the fuel cell system 1 is coupled), respectively, for purposes of starting up the fuel cell system 1.

More particularly, as described below, the relays 5 control a power up sequence that begins in response to a pulse that appears in a signal called START. In this manner, when the pulse appears in the START signal, the relays 5 initiate a power up sequence, such as a sequence 70 that is depicted in FIG. 2.

Figure 2:
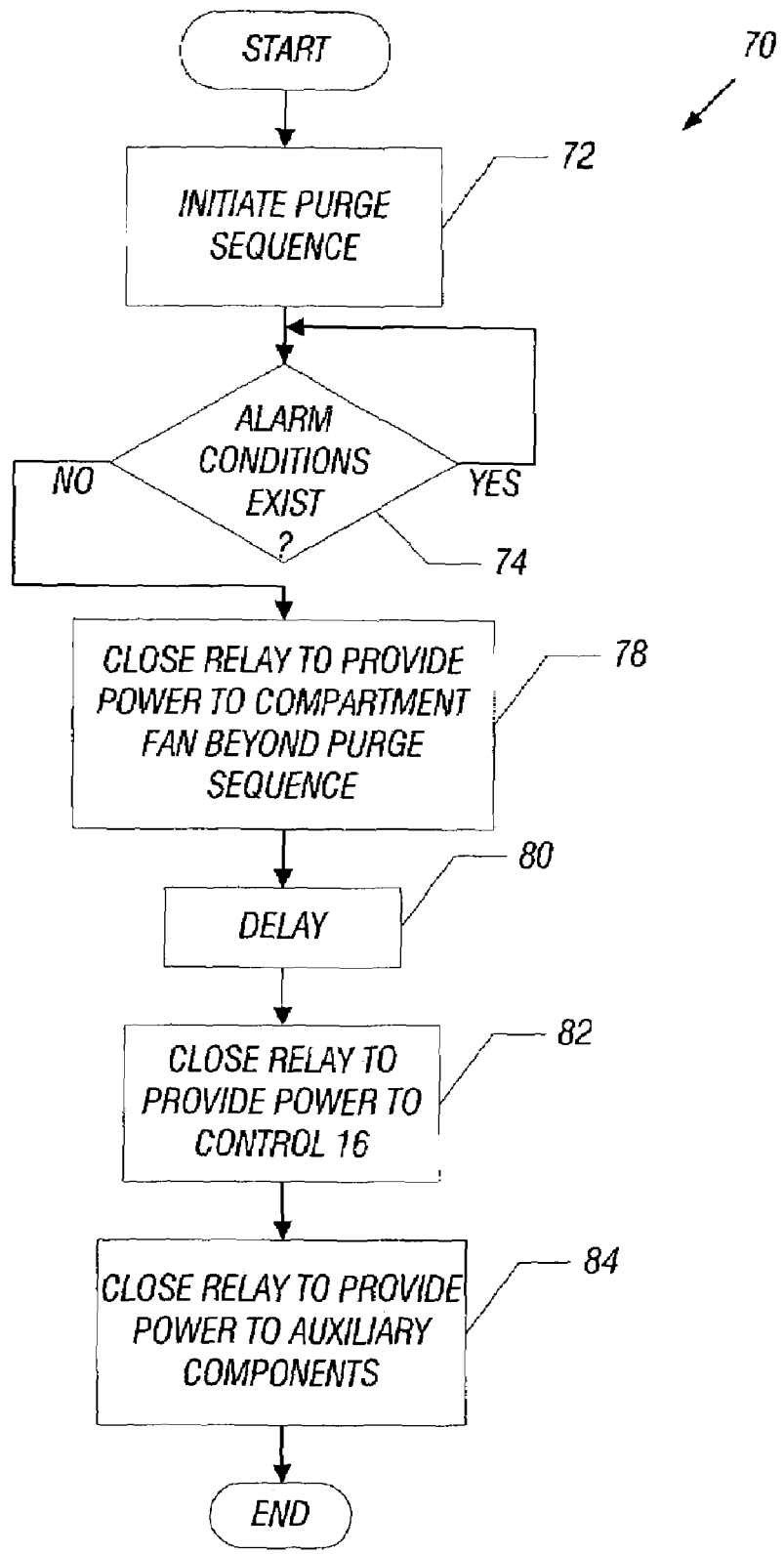
FIG. 2 is a flow diagram depicting a scheme to power up the fuel cell system according to an embodiment of the invention.

Referring also to FIG. 2, to begin the sequence 70, one of the relays 5 closes to turn on a compartment fan 14 (of the fuel cell system 1) to initiate (block 72) a purge sequence, a sequence to purge any stray gases inside the fuel cell compartment that houses the various components 10 of the fuel cell system 1, such as a fuel cell stack 20 and a system and reformer controller 16.

For purposes of purging gas from the compartment, an underpressure condition is established in the compartment by the fan 14 drawing air from the compartment into the oxidant flow path to the fuel cell stack 20. More particularly, by drawing air from the compartment into the oxidant flow path, stray gases from inside the compartment are drawn into the fuel cell stack 20 and consumed by reactions inside the stack 20. This arrangement is described in more detail in U.S. patent application Ser. No. 09/502,885, entitled, "METHOD AND APPARATUS FOR ESTABLISHING A NEGATIVE PRESSURE INSIDE AN ENCLOSURE THAT HOUSES A FUEL CELL SYSTEM," filed on Feb. 11, 2001, which is hereby incorporated by reference.

To initiate this purge sequence, one of the relays 5 closes to deliver the $V_{DC}$ voltage signal to the compartment fan 14 via a power line 206. This delivery of power to the compartment fan 14, in turn, causes the fan 14 to operate.

The purge sequence has a finite duration and should place the fuel cell system 1 in condition for powering up, as soon as a specific underpressure state is established inside the fuel cell compartment. This underpressure condition may be sensed via a pressure sensor, one of the many sensors 7 (FIG. 1) that are present in the fuel cell system 1. Along with the underpressure condition, the system 1 checks if any other alarm conditions exist before continuing the power up sequence 70.

In some embodiments of the invention, for purposes of determining if alarm conditions are present, the fuel cell system 1 checks the status of the sensors 7 by checking the status of switches 8. In this manner, the switches 8 are each associated with a different sensor 7 to indicate whether the sensor 7 has detected an alarm condition. For example, the sensor 7 may include a fuel gas flow sensor, a reformer overpressure sensor, a humidifier water pressure sensor, a methane sensor and various temperature and pressure sensors, as just a few examples. In some embodiments of the invention, a particular switch 8 closes to indicate that the associated sensor 7 does not indicate an alarm condition and opens to indicate an alarm condition. In some embodiments of the invention, the switches 8 are connected together serially in a loop such that when one of the switches 8 opens to indicate an alarm the serial loop is open, an indication with this configuration, the fuel cell system 1 may detect whether that an alarm condition for the fuel cell system 1.

As an example, a switch 8a may be associated with a sensor 7 that detects an underpressure condition in the fuel cell compartment, and a switch 8b may be associated with a sensor 7 that detects the presence of a particular gas (hydrogen, for example). Thus, before the purge sequence begins and at least during the beginning of the purge sequence, the switches 8a and 8b may be open.

Continuing the description of the power up sequence 70 in FIG. 2, the fuel cell system 1 determines (diamond 74) if any alarm condition exists by determining if any of the switches 8 are open. In response to none of the switches 8 being open, the sequence 70 includes closing (block 78) one of the relays 5 to communicate the $V_{DC}$ voltage signal to the power line 204 (FIG. 1) to provide power to the compartment fan 14 beyond the duration of the purge sequence.

In this manner, at the completion of the purge sequence, the relay 5 that communicates the $V_{DC}$ voltage signal to the power line 206 opens. Therefore, to continue powering the compartment fan 14 beyond the expiration of the purge sequence, power must be provided to the fan 14 via the power line 204, the power line used for continued operation of the fan 14.

The next step in the power of sequence 70 involves introducing (block 80) a delay to allow a safety margin past the time when the underpressure condition is established. At the expiration of this delay, one of the relays 5 is closed (block 82) to communicate the $V_{DC}$ voltage signal to a power line 202 to provide power to the system and reformer controller 16. Subsequently, another one of the relays 5 closes (block 84) to provide power (via a power line 200) to auxiliary components 12 of the fuel cell system 1.

Figure 3:
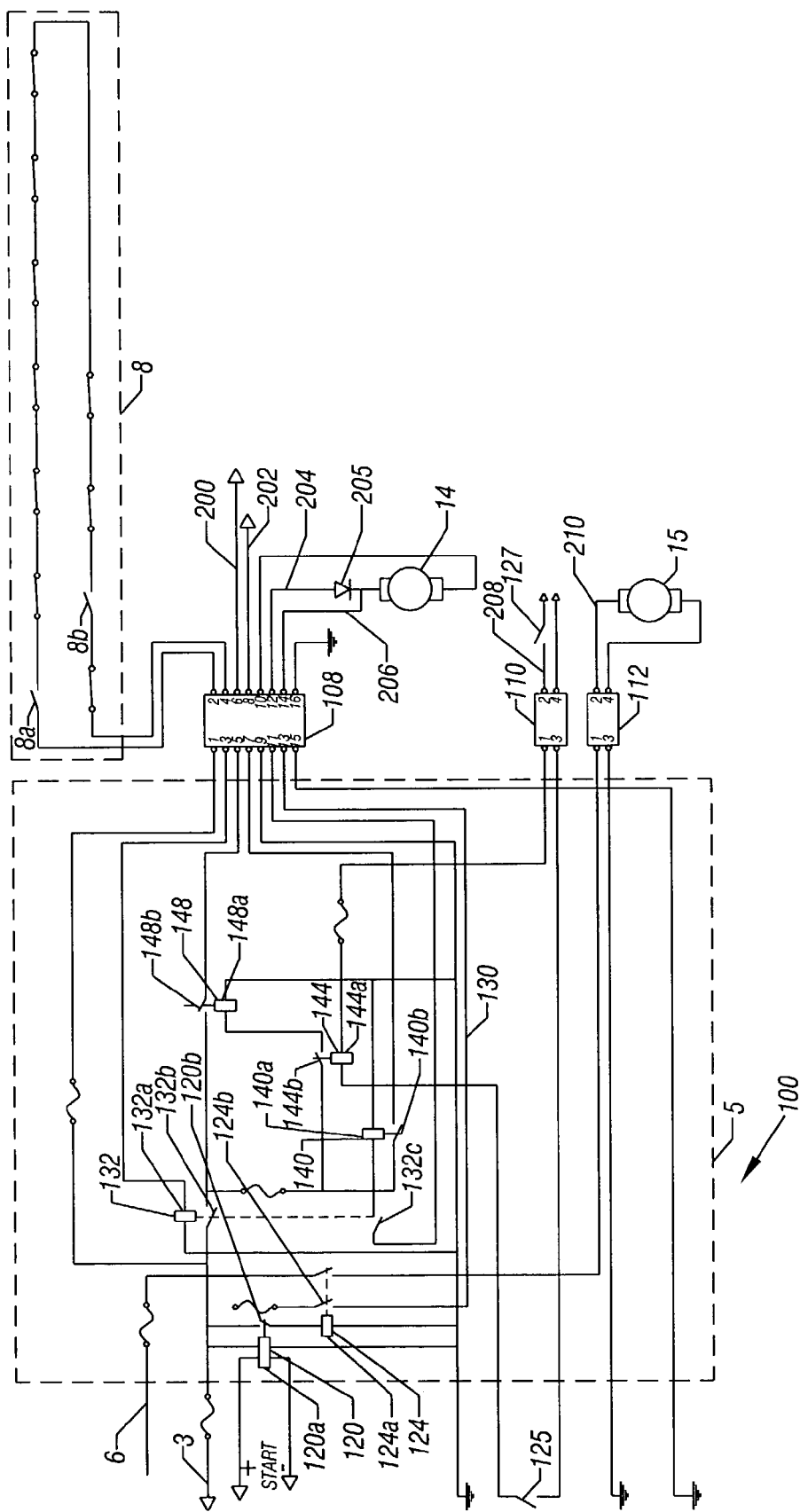
FIGS. 3 and 9 are more detailed schematic diagrams of portions of the fuel cell system according to embodiments of the invention.

Turning now to a more specific, possible embodiment of the invention that is depicted in FIG. 3, the relays 5 may include a power relay 132, a relay that has a main coil, or winding 132a, that controls a relay switch 132b and a relay switch 132c. The relay switch 132b, in turn, controls communication between a DC input power line 3 (that furnishes the $V_{DC}$ voltage signal) and an internal power node 135. The switch 132c controls communication between the internal power node 135 and the power line 204, the line that communicates power to the compartment fan 14 for the purge sequence. The power relay 132 is the relay that serves as the master control of the $V_{DC}$ voltage signal to the various fuel cell system components 10. Thus, when the switches 132b and 132c are open, no component of the fuel cell system 10 receives power via the $V_{DC}$ voltage signal, and when the relay 132 closes, these switches 132b and 132c, power is provided to the internal node 135 and to the compartment fan 14, with the power to the remaining fuel cell system components 10 being determined by other relays, as described below.

The main winding 132a of the relay 132 is connected in a serial loop with switches 8 between ground and the $V_{DC}$ voltage signal. Therefore, when all of sensors 7 indicate that no alarm conditions exist (and thus, all switches 8 are closed), the relay 132 closes the switches 132b and 132c to permit power to be communicated to the components 10.

In some embodiments of the invention, the relays 5 include a purge timer relay 120 that is coupled to respond to the START signal to close its switch 120b in response to a pulse 300 (see FIG. 4) appearing in the START signal. The switch 120b is coupled between the power line 3 and the main winding 124a of a relay 124. The relay 124, in turn, controls operations of switches 124b and 124c. The switch 124b is coupled between the power line 3 and the power line 206, and the switch 124c is coupled between the power line 3 and a power line 210 that communicates the $V_{AC}$ signal to a fan 15 to provide ventilation to other components as needed.

Thus, referring to FIGS. 3, 4 and 5, as an example of operation of the above-described relays, the pulse 300 may end at time $T_0$, and in response to the end of the pulse 300, the switch 120b closes to activate the main winding 124a of the relay 124. This activation, in turn, closes the switches 124b and 124c to begin a purge sequence (a three to six minute purge sequence, for example) in which the voltage of the power line 206 (depicted in FIG. 5) is pulsed high, as indicated by the pulse 304. Thus, during this time, the fan 14 receives power to draw air to establish an underpressure condition in the fuel cell compartment. Therefore, in response to the operation of the compartment fan 14, the sensors 7 eventually indicate that an underpressure condition is established in the compartment and thus, activate the main winding 132a of the relay 132 to close the switches 132b and 132c, assuming no alarm conditions exist.

Thus, at time $T_1$ in this example, the $V_{DC}$ voltage is supplied to the internal node 135 and other relays (described below) selectively communicate the $V_{DC}$ voltage signal from the internal node 135 to the components 10. For example, the relays 5 include a relay 140 (FIG. 3) that has its main winding 140a coupled between the internal node 135 and ground. The relay 140 operates a switch 140b that is coupled between the internal node 135 and the power line 202 that supplies power to the system reformer controller 16. The relay 140 is a timer relay that measures a predetermined delay time after time $T_1$ (see FIG. 6) before closing its switch 140b to supply power to power line 204, as depicted in FIG. 6. Due to a diode 205 (FIG. 3) that is coupled between the power line 204 and the fan 14, when the relay 140 closes the switch 140b, the compartment fan 14 remains on even after the lapse of the purge sequence pulse 304. Thus, as an example, in FIG. 8, the voltage of line 202 is pulsed high at time $T_2$ due to the predetermined delay from time $T_1$ when the relay 132 closes its switches 132b and 132c.

The relays 5 also include a relay 148 (FIG. 3) that has its main winding 148a coupled between the internal node 135 and ground. A switch 144b of a relay 144 is coupled between the main winding 148a of the relay 148 and the node 135. A switch 148b of the relay 148 is coupled between the internal node 135 and the power line 200 that supplies power to the auxiliary components 12. Therefore, when the relay 148 closes its switch 148b, power is provided to the auxiliary components 12. However, due to the inclusion of the switch 144b in series with the main winding 148a of the relay 148, the switch 144b must be closed before power is provided to the auxiliary components 12.

The relay 144 operates to close its switch 144b once power to the controller 16 has been established. More particularly, one terminal of the main winding of the relay 144a is coupled to ground by a switch 125 that is automatically closed when the controller 16 indicates it has powered up. The other terminal of the main winding 144a of the relay 144 is coupled to a positive DC signal voltage.

In some embodiments of the invention, the sensors 7 may each be associated with a breaker circuit. Circuit breakers are well known in the electronics arts. It will be appreciated that a particular circuit breaker may be selected to accommodate the current and voltage range of the power normally relayed by the breaker. Each breaker may provide a visual indication of its status. In this manner, when a particular breaker opens (to open the associated switch 8), the breaker indicates (via a transparent window of the breaker, for example) that the breaker has opened. For example, a colored flag or indication may appear in the breaker window when the breaker has been tripped open. Otherwise, the colored indication does not appear thereby indicating the breaker is closed. Therefore, when the fuel cell system 1 shuts down due to the detection of an alarm condition, a service technician may view the breakers to determine which breaker has opened and thus, make a determination of the cause of the shutdown.

One particular type of breaker circuit that can be used is a thermal cut-out switch. Such devices are configured to break an electric connection when a temperature of the device reaches a desired limit (e.g., part no. 4344-188-10 form Texas Instruments). As another example, a pressure switch may also be used in this way as an emergency stop if a system pressure is out of specification. For example, a cabinet or system compartment may be kept under a vacuum, or reactant plumbing may be monitored for over-pressure events (e.g., part no. 3202.01\10 from Weber Sensors may be used in this way).

In some embodiments of the invention, one or more of the relays 5 may be manually overridden by a manually controlled switch. Thus, due to this arrangement, for purposes of servicing the fuel cell system 1, a service technician may manually start up the fuel cell system 1 and override the automatic startup and purge sequence 70 that is described above. Other variations are possible.

Figure 9:
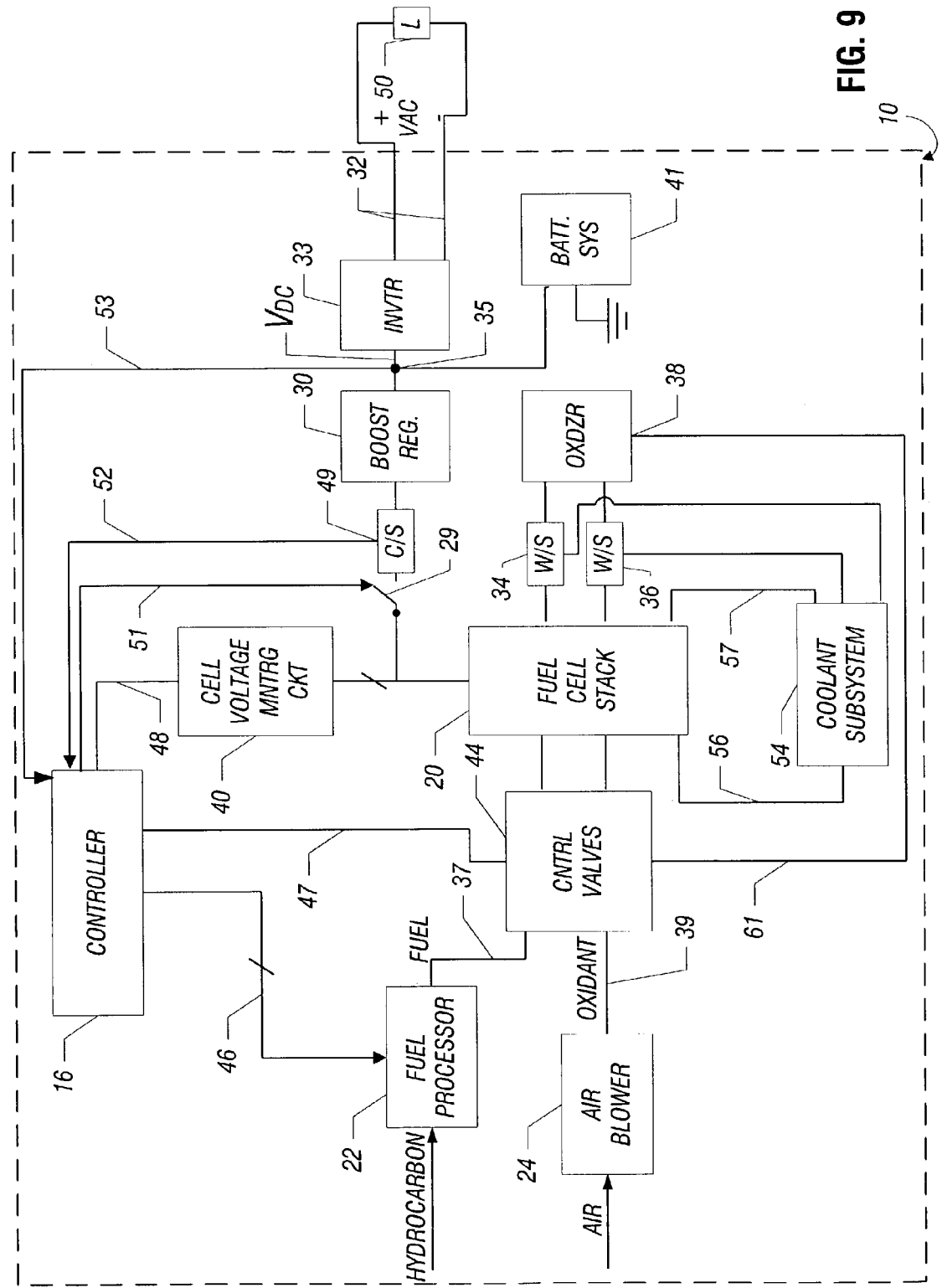

Referring to FIG. 9, besides the components described above, the fuel cell system 1 may include other components, such as a DC-to-DC voltage regulator 30 that regulates the voltage from the fuel cell stack 20 to produce a regulated DC output voltage. This DC output voltage may be converted into an AC voltage via an inverter 33 of the fuel cell system 1. The fuel cell system 1 also includes control valves 44 that may be controlled by the controller 16 to divert some of the fuel flow that is otherwise received by the fuel cell stack 22 to an oxidizer 38 via a flow line 35. The control valves 44 may also provide emergency shut off of the oxidant and fuel flows to the fuel cell stack 20. The control valves 44 are coupled between inlet fuel 37 and oxidant 39 lines and the fuel and oxidant manifold inlets, respectively, to the fuel cell stack 20. The inlet fuel line 37 receives a fuel flow from a fuel processor 22, and the inlet oxidant line 39 receives an oxidant flow from an air blower 24.

The fuel processor 22 receives a hydrocarbon (natural gas or propane, as examples) and converts this hydrocarbon into the fuel flow (a hydrogen flow, for example) that is provided to the fuel cell stack 20. The fuel cell system 1 may also include additional components, such as water separators 34 and 36, to recover water from the outlet and/or inlet fuel and oxidant ports of the fuel cell stack 20. The water that is collected by the water separators 34 and 36 may be routed to a water tank (not shown) of a coolant subsystem 54 of the fuel cell system 1. The coolant subsystem 54 circulates a coolant (deionized water, for example) through the fuel cell stack 20 regulate the operating temperature of the stack 20. In some embodiments of the invention, the controller 16 may include a microcontroller and/or a microprocessor to perform one or more techniques associated with controlling operation of the fuel cell stack 20.

While the invention has been disclosed with respect to a limited number of embodiments, those skilled in the art, having the benefit of this disclosure, will appreciate numerous modifications and variations therefrom. It is intended that the appended claims cover all such modifications and variations as fall within the true spirit and scope of the invention.

What is claimed is:

1. A method comprising:
    an operation to establish negative pressure inside a compartment that houses fuel cell system components to draw any stray gas present in the compartment into a fuel cell stack;
    providing power to the fuel cell system components;
    providing sensors to monitor conditions of the fuel cell system including a sensor to monitor whether the negative pressure is present;
    associating the status of each sensor with a switch;
    serially coupling the switches together; and
    regulating the delivery of the power to the fuel cell system components in response to states of the switches.

2. The method of claim 1, wherein the regulating the delivery comprises:
    determining if at least one of the switches is in an open state.

3. The method of claim 2, wherein the determining comprises:
    attempting to pass a current through the switches; and
    determining that one of the switches is open if the attempt fails.

4. The method of claim 1, wherein the delivering power to the fuel cell system components comprises:
    providing power to the components in response to all of the switches remaining in closed states.

5. The method of claim 1, wherein the sensors comprise at least one of the following:

a temperature sensor, a pressure sensor, a fuel sensor and an oxidant sensor.

6. An automated control circuit for a fuel cell, comprising:
a controller adapted to initiate an operation to establish negative pressure inside a compartment that houses fuel cell system components to draw any stray gas present in the compartment into a fuel cell stack and deliver power to the fuel cell system components;
sensors to sense conditions in the fuel cell system, including a sensor to sense whether the negative pressure is present;
switches, each switch associated with one of the sensors and adapted to indicate an alarm condition associated with the sensor; and
wherein the controller is adapted to remove power from the fuel cell system components in response to one of the switches indicating an alarm condition.

7. The control circuit of claim 6, wherein the controller determines if at least one of the switches is in an open state to regulate delivery.

8. The control circuit of claim 7, wherein the controller attempts to pass a current through the serial connection and determines that one of the switches is open if the attempt fails.

9. The control circuit claim 6, wherein the controller provides power to the components in response to all of the switches remaining in closed states.

10. The control circuit of claim 6, wherein the sensors comprise at least one of the following:
a temperature sensor, a pressure sensor, a fuel sensor and an oxidant sensor.

11. An automated control circuit for a fuel cell, comprising:
a controller adapted to initiate an operation to establish negative pressure inside a compartment that houses fuel cell system components to draw any stray gas present in the compartment into a fuel cell stack and provide power to the fuel cell system components;
a state detection circuit comprising switches in series, wherein the sensors are each adapted to interrupt the state detection circuit by opening at least one of the switches when an undesirable condition is detected by one of the sensors and the sensors include a sensor to indicate whether the negative pressure is present;
wherein the controller is adapted to remove power from the group of fuel cell system components when the state detection circuit is interrupted; and
wherein each sensor is adapted to visually indicate an interruption of the state detection circuit in response to the power being removed from the system components.

12. The control circuit of claim 11, wherein the controller determines if at least one of the switches is in an open state to regulate delivery.

13. The control circuit of claim 12, wherein the controller attempts to pass a current through the serial connection; and determines that one of the switches is open if the attempt fails.

14. The control circuit of claim 11, wherein the controller provides power to the components in response to all of the switches remaining in closed states.

15. The control circuit of claim 11, wherein the sensors comprise at least one of the following:
a temperature sensor, a pressure sensor, a fuel sensor and an oxidant sensor.

16. The method of claim 1, wherein the fuel cell system components comprises a fan to establish the negative pressure, and the act of initiating comprise temporarily providing power to the fan before the act of providing the power begins.

17. The control circuit of claim 6, wherein the fuel cell system components comprise an air flow device to establish the negative pressure, and the controller comprises a first relay to temporarily power the air flow device before power is provided to the remaining components and to not be responsive to the switches, and a second relay to provide power to the remaining components and to be responsive to the switches.

* * * * *